United States Patent
Cordier et al.

(10) Patent No.: US 6,267,805 B1
(45) Date of Patent: Jul. 31, 2001

(54) APPARATUS FOR SCRUBBING A CONTINUOUS FLOW OF GAS CHARGED WITH SOLID PARTICLES

(75) Inventors: André Cordier, Clamart; Didier Sedaries, Meudon la Foret; Christophe Pierin, Champagne sur Oise; Alain Eyraud, Levallois Perret, all of (FR)

(73) Assignee: Societe Anonyme dite Air Industrie Systemes - A.I.S., Courbevoie (FR)

( * ) Notice: Subject to any disclaimer, the term of this patent is extended or adjusted under 35 U.S.C. 154(b) by 901 days.

(21) Appl. No.: 08/951,003

(22) Filed: Oct. 15, 1997

Related U.S. Application Data

(63) Continuation of application No. 08/509,233, filed on Jul. 31, 1995, now abandoned.

(30) Foreign Application Priority Data

Aug. 10, 1994 (FR) .................................................. 94 09901

(51) Int. Cl.[7] .................................................. B01D 46/00
(52) U.S. Cl. .................................. 96/262; 96/273; 96/280; 96/333; 96/358; 261/114.3
(58) Field of Search .................................. 55/223, 229, 244, 55/248, 250, 240, 257.3; 261/114.3, 114.5; 96/262, 265, 273, 280, 328, 333, 337, 358, 360

(56) References Cited

U.S. PATENT DOCUMENTS

| | | | |
|---|---|---|---|
| 2,091,349 | * 8/1937 | Bergman | 261/114.3 |
| 2,690,332 | * 9/1954 | Jorgensen | 261/114.5 |
| 3,053,520 | * 9/1962 | Strueber | 261/114.5 |
| 3,225,522 | * 12/1965 | Black | 55/223 |
| 3,653,186 | * 4/1972 | McLendon | 55/240 |
| 3,685,261 | * 8/1972 | McIlvaine et al. | 55/240 |
| 3,807,143 | * 4/1974 | Dunn | 55/223 |
| 4,060,399 | * 11/1977 | Gleason | 55/244 |
| 4,318,870 | * 3/1982 | Haselden | 261/114.3 |
| 4,472,324 | * 9/1984 | Hawryluk | 55/229 |

FOREIGN PATENT DOCUMENTS

| | | | |
|---|---|---|---|
| 966559 | * 8/1957 | (DE) | 55/229 |
| 2231855 | 2/1973 | (DE) . | |
| 2004219 | 11/1969 | (FR) . | |
| 2437232 | 4/1980 | (FR) . | |
| 2684022 | 5/1993 | (FR) . | |
| 55-41121 | * 10/1980 | (JP) | 261/114.5 |
| 472662 | * 9/1975 | (SU) | 261/114.3 |

* cited by examiner

Primary Examiner—C. Scott Bushey
(74) Attorney, Agent, or Firm—Sughrue, Mion, Zinn, Macpeak & Seas, PLLC

(57) ABSTRACT

The invention relates to an apparatus for scrubbing with water a continuous flow of charged gas, the apparatus including a scrubbing chamber; an inlet via which the scrubbing water is fed into the scrubbing chamber; a scrubbing throat for mixing the scrubbing water with the charged gas in the scrubbing chamber; a removal device for removing the scrubbing water and the collected particles; and a removal device for removing the continuous flow of at least partially scrubbed gas. According to the invention, the inlet for the scrubbing water is for feeding the scrubbing water into the scrubbing chamber while the water is not in the form of a spray, the scrubbing throat includes a bottom plate that is perpendicular to the continuous flow of charged gas, and that is provided with at least one longitudinal slot extended, at least on that side of the plate which is closer to the scrubbing chamber, by two walls forming a longitudinal adjutage, the longitudinal slot constituting an inlet via which the continuous flow of charged gas enters the scrubbing chamber, and the removal device for removing the scrubbing water and the collected particles include at least one overflow projecting from the bottom plate towards the scrubbing chamber.

13 Claims, 2 Drawing Sheets

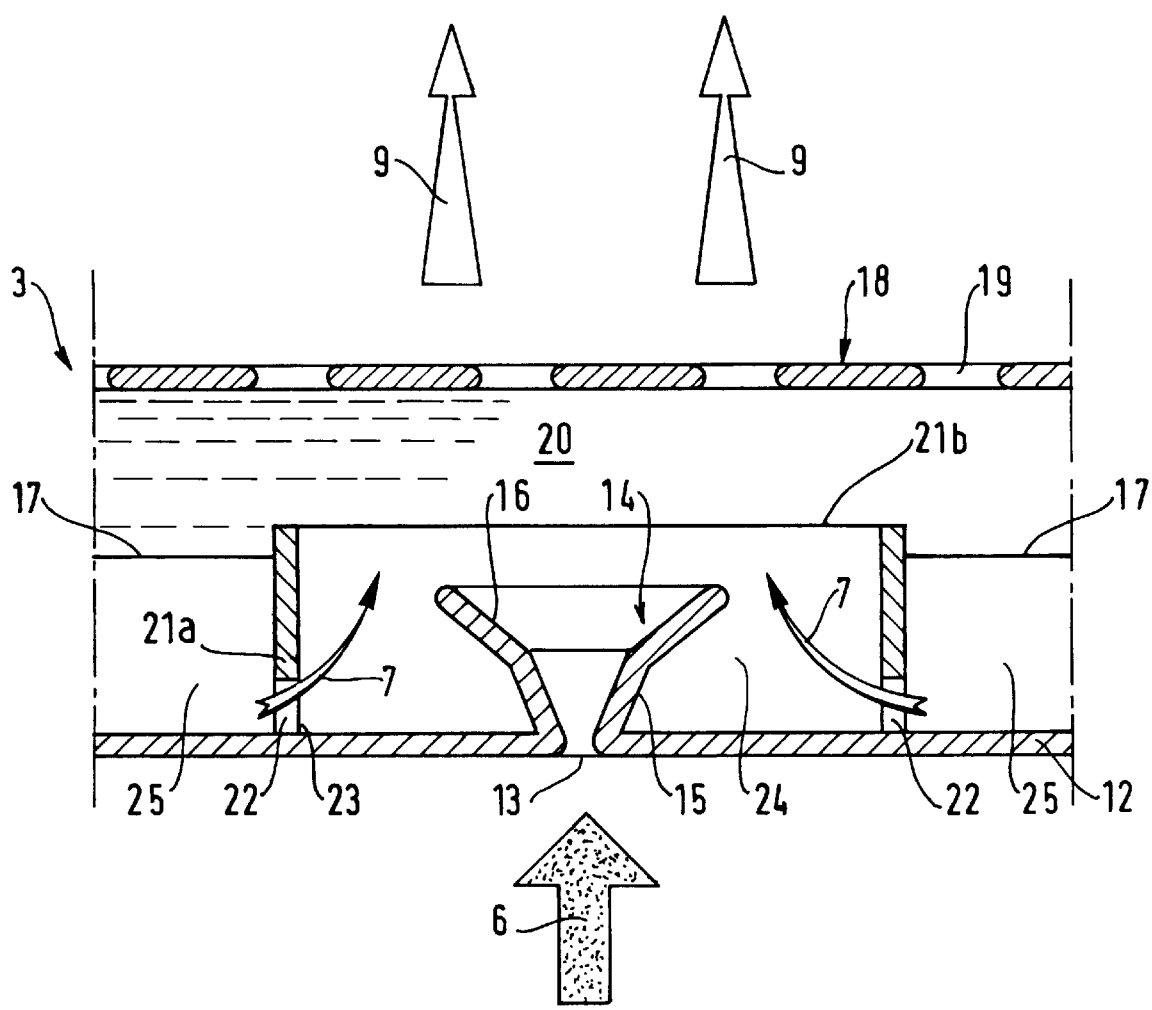

APPARATUS FOR SCRUBBING A CONTINUOUS FLOW OF GAS CHARGED WITH SOLID PARTICLES

This is a Continuation of application Ser. No. 08/509,233 filed Jul. 31, 1995 now abandoned.

The invention relates to an apparatus for scrubbing a flow of gas charged with solid particles.

More particularly, the invention relates to an apparatus for scrubbing with water a flow of gas charged with solid or semi-solid particles.

BACKGROUND OF THE INVENTION

Certain known types of such apparatuses operate on the principle of mixing the gas charged with solid particles with scrubbing water in the form of a spray whose fineness may be varied, so that the solid or semi-solid particles are collected by the droplets of scrubbing water. The scrubbed gas is then exhausted on one side, while the scrubbing water and the collected solid particles are recovered on another side.

A known type of such apparatus includes water-spraying devices situated in or in the vicinity of the flow of gas to be scrubbed, and combined with throat devices such as perforated plates or the like. Mixing of the gas with the scrubbing water is generated by the speed of the gas passing through the throat device. At the periphery of the flow, this speed causes induction of the scrubbing water which is entrained in the downstream flow. Such apparatus generally includes a plurality of scrubbing stages in series so that the head loss of the flow of gas per stage remains acceptable for good mixing. Each stage includes a throat device, e.g. of the perforated plate type, and at least one set of scrubbing water sprayers. The particles collected from the flow of at least partially scrubbed gas are separated from the scrubbing water by inertia. Such an apparatus also includes a closed circuit device for recycling and re-using the scrubbing water. The charged scrubbing water is therefore conveyed from stage to stage towards a settling tank or the like, where it is recycled prior to being sent back to the spray devices.

To ensure that the apparatus is properly effective, the water must be distributed properly by the sprayers, and this means that spray nozzles having small cross-sectional areas must be used. Unfortunately, the recycled scrubbing water is never entirely free of particles, or even large-volume agglomerations of particles that did not settle out during recycling. These impurities are entrained back to the spray devices with the recycled scrubbing water, and they form deposits on the inside of the spray devices, or they even partially or totally block the spray nozzles. Naturally, this reduces the effectiveness of the apparatus.

After the particles have been collected, they form agglomerations which constitute most of the residue obtained by the apparatus. If such agglomerations are not removed as they are formed, they increase in volume, and, when the apparatus is stopped, they are deposited and become stuck inside the scrubbing chambers of each stage. Naturally, the complexity of the return circuit for the scrubbing water charged with agglomerations is increased by the presence of multiple scrubbing stages.

OBJECTS AND SUMMARY OF THE INVENTION

An object of the present invention is to provide an apparatus for scrubbing with water a flow of charged gas that does not require sprayers for the scrubbing water.

Another object of the present invention is to provide an apparatus in which the gas/water mixing is optimized so that only one scrubbing stage is required.

Another object of the present invention is to provide an apparatus that improves removal of the charged scrubbing water, and that feeds the mix with scrubbing water that is cleaner.

To this end, the invention provides an apparatus for scrubbing with water a continuous flow of charged gas that is charged with solid or semi-solid particles, the apparatus including: a scrubbing chamber delimited by a side wall; inlet means via which the scrubbing water is fed into the scrubbing chamber; scrubbing throat means for mixing the scrubbing water with the charged gas in the scrubbing chamber; removal means for removing the scrubbing water and the collected particles; and removal means for removing the continuous flow of at least partially scrubbed gas.

According to the invention, the inlet means for the scrubbing water are means for feeding the scrubbing water into the scrubbing chamber while the water is not in the form of a spray, the scrubbing throat means comprise a bottom plate that is perpendicular to the continuous flow of charged gas, and that is provided with at least one longitudinal slot extended, at least on that side of the plate which is closer to the scrubbing chamber, by two walls forming a longitudinal adjutage, said longitudinal slot constituting an inlet via which the continuous flow of charged gas enters the scrubbing chamber, and wherein the removal means for removing the scrubbing water and the collected particles comprise at least one overflow projecting from the bottom plate towards the scrubbing chamber.

The overflow has an overflow height that is not less than the height of the longitudinal adjutage.

Advantageously, the bottom plate is provided with a plurality of longitudinal slots that are parallel to one another, each of which is extended by a longitudinal adjutage.

In an embodiment of the invention, the longitudinal adjutage has a cross-section in the general shape of a trapezium, with the small base adjoining the plate.

In another embodiment of the invention, the longitudinal adjutage has a cross-section in the general shape of two trapeziums, the small base of the first trapezium adjoining the plate, the second trapezium extending the first trapezium, and the small base of the second trapezium adjoining the large base of the first trapezium.

Advantageously, the scrubbing throat means further include a splitter situated downstream from the longitudinal adjutages and provided with a plurality of through orifices via which a compound continuous flow made up at least of scrubbing water and of the continuous flow of charged gas can pass into the scrubbing chamber.

According to a characteristic of the invention, each longitudinal adjutage is flanked on either side by longitudinal walls projecting from the bottom plate towards the scrubbing chamber. These walls have a height that is greater than the overflow height of the removal means for removing the scrubbing water and the collected particles and are provided with feed openings for feeding the corresponding longitudinal adjutage. These openings are situated in the vicinity of that edge of each of the longitudinal walls which adjoins the bottom plate.

BRIEF DESCRIPTION OF THE DRAWINGS

Other characteristics and advantages appear from the following description given with reference to the accompanying drawings, in which:

FIG. 5 is a diagrammatic view of a detail of the view shown in FIG. 3.

MORE DETAILED DESCRIPTION

Figure 1:
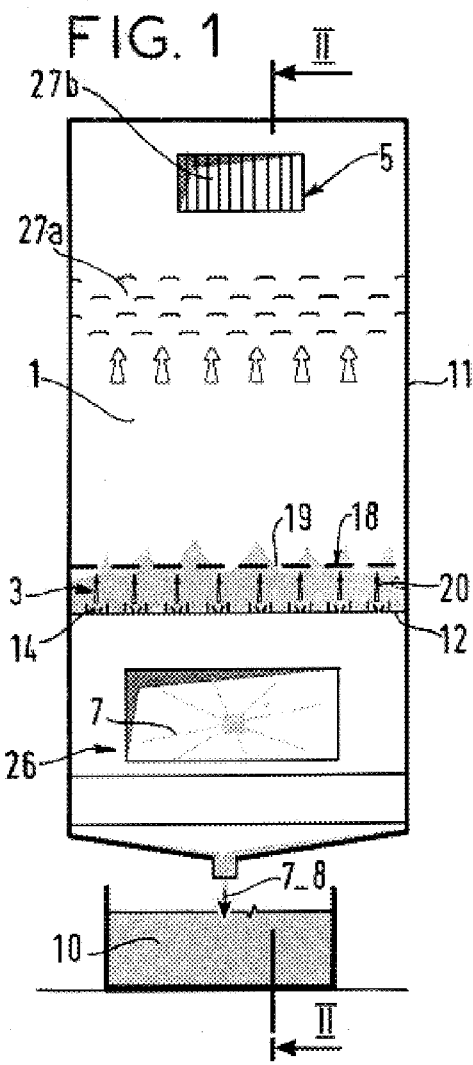
FIG. 1 is a diagrammatic section view of apparatus of the present invention.
Figure 2:
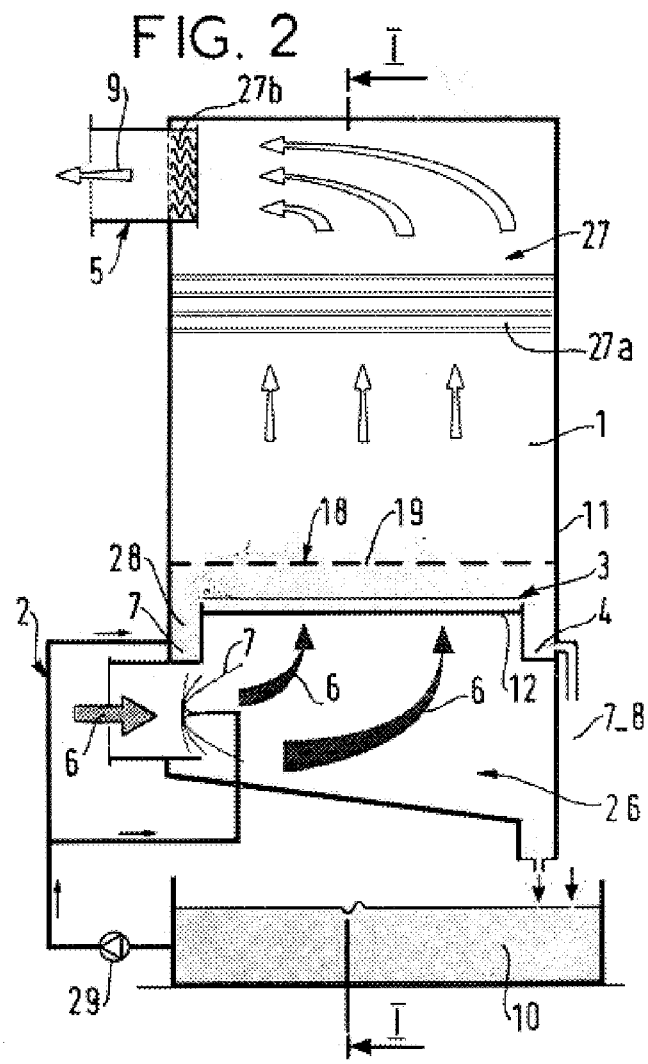
FIG. 2 is a diagrammatic section view on line II—II of the view shown in FIG. 1.

In the following description, it is to be understood that the terms "upstream" and "downstream" are defined relative to the direction of flow of the gas to be scrubbed or of the scrubbed gas, represented by respective arrows referenced 6 and 9.

The apparatus of the invention for scrubbing with water a continuous flow of charged gas 6 that is charged with solid or semi-solid particles includes a scrubbing chamber 1, inlet means 2 via which the scrubbing water 7 is fed into the scrubbing chamber 1; scrubbing throat means 3 for mixing the scrubbing water 7 with the charged gas 6 in the scrubbing chamber 1; removal means 4 for removing the scrubbing water 7 and the collected particles 8; removal means 5 for removing the continuous flow of at least partially scrubbed gas 9; and separation and recycling means 10 for separating the removed scrubbing water 7 from the removed collected particles 8, and for recycling the scrubbing water.

The scrubbing chamber 1 is delimited by a side wall, by the throat means at the upstream end, and by the removal means 5 for removing the flow of at least partially scrubbed gas 9 at the downstream end.

The inlet means 2 via which the scrubbing water 7 is fed into the scrubbing chamber 1 have substantially zero head loss, since the scrubbing water 7 does not arrive in the form of a spray.

In the embodiment shown in the figures, the inlet means 2 open into the scrubbing chamber 1 in the vicinity of the upstream end via an open mouth or the like.

The scrubbing throat means 3 comprise a bottom plate 12 that is perpendicular to the continuous flow of charged gas 6, and that is provided with at least one longitudinal slot 13. The longitudinal slot 13 is extended, at least on that side of the plate which is closer to the scrubbing chamber 1, by two walls forming a longitudinal adjutage 14. The longitudinal slot 13 constitutes an inlet via which the continuous flow of charged gas 6 enters the scrubbing chamber 1.

Advantageously, the bottom plate 12 is provided with a plurality of longitudinal slots 13 that are parallel to one another, each of which is extended by a longitudinal adjutage 14 as shown in FIG. 1.

In an embodiment that is not shown, the longitudinal adjutage has a cross-section in the general shape of a trapezium, with the small base adjoining the plate.

In an embodiment that is shown, the longitudinal adjutage has a cross-section in the general shape of two trapeziums, the small base of the first trapezium 15 adjoining the bottom plate 12, the second trapezium 16 extending the first trapezium 15, and the small base of the second trapezium 16 adjoining the large base of the first trapezium 15.

The respective heights of the first trapezium 15 and of the second trapezium 16 are substantially the same size.

The removal means 4 for removing the scrubbing water 7 and the collected particles 8 comprise at least one overflow 17 projecting from the bottom plate.

The overflow 17 has an overflow height that is not less than the height of the longitudinal adjutage.

The scrubbing throat means 3 further include a splitter 18 situated downstream from the longitudinal adjutages 14 and provided with a plurality of through orifices 19 via which a compound continuous flow 20 made up at least of scrubbing water 7 and of the continuous flow of charged gas 6 can pass into the scrubbing chamber 1.

In the embodiment shown in the figures, the splitter 18 is parallel to the bottom plate 12.

The through orifices 19 in the splitter may be of any shape, and may or may not be directed.

Advantageously, each adjutage 14 is flanked longitudinally on either side by longitudinal walls 21a, and is flanked transversely at either end by transverse walls 21b projecting from the bottom plate 12 towards the scrubbing chamber 1. The longitudinal walls 21a and the transverse walls 21b co-operate to form an enclosure 24 that surrounds the adjutage, and that is open towards the scrubbing chamber 1, the enclosure having a height that is greater than the overflow height of the removal means 4 for removing the scrubbing water 7 and the collected particles 8. Said walls are provided with feed openings 22 for feeding the corresponding longitudinal adjutage 14 with scrubbing water 7. These openings are preferably situated in the vicinity of that edge 23 of each of the longitudinal walls 21a which adjoins the bottom plate 12.

Figure 3:
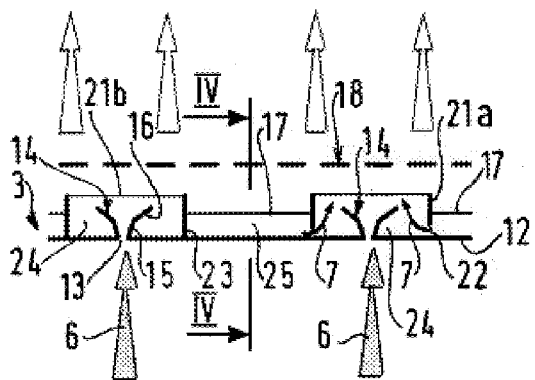
FIG. 3 is a diagrammatic section view of the scrubbing throat means of apparatus of the present invention.
Figure 4:
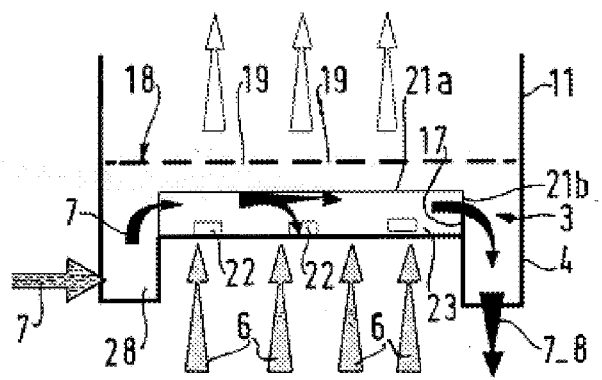
FIG. 4 is a diagrammatic section view on line IV—IV of the view shown in FIG. 3.

Alternatively, as shown in FIG. 3, the bottom plate 12 is provided with an enclosure 24 containing a longitudinal adjutage 14 followed by a reservoir/collector segment 25.

The apparatus of the invention includes a pre-wetting chamber 26 for pre-wetting the flow of charged gas 6, which chamber is located upstream from the scrubbing throat means.

The apparatus of the invention includes at least one de-moisturizing stage 27 for de-moisturizing the flow of at least partially scrubbed gas 9, which stage is constituted by a baffle-type filter 27a or by a droplet remover 27b, and is located between the scrubbing chamber 1 and the removal means 5 for removing the flow of at least partially scrubbed gas 9.

In the embodiment shown in the figures, the outside of the side wall 11 is generally rectangular block-shaped, with four side faces, the longitudinal slots extending between two opposite side faces, the inlet means for the scrubbing water being located in the vicinity of one of the faces, thereby defining a transverse feed trench 28 below the level of the bottom plate 12 for feeding the reservoir/collector segments 25 only, the removal means for removing the scrubbing water and the collected particles being located in the vicinity of the opposite face, and in the reservoir/collector segments 25 only.

The apparatus operates as follows:

The flow of charged gas arrives in the pre-wetting chamber 26 where it is moisturized at the same time as the upstream face of the bottom plate and the remainder of the pre-wetting chamber 26. The purpose of this is to prevent clogging of the longitudinal adjutages 14 and of the walls making up the pre-wetting chamber 26. This chamber is provided with means for recovering and recycling the pre-wetting water.

The scrubbing water 7 is distributed firstly to the pre-wetting chamber and secondly to the feed trench 28 by means of a pump 29.

The flow of charged gas passes through the longitudinal adjutages 14. The speed of the flow of charged gas as it leaves the adjutages generates suction in its immediate vicinity, thereby sucking up the scrubbing water lying flush with the adjutages, and entraining it with the flow.

The resulting compound flow passes through the orifices in the splitter, thereby guaranteeing optimum mixing in the scrubbing chamber.

At least some of the solid or semi-solid particles are collected by the scrubbing water.

The scrubbing water together with the collected particles that form agglomerations floating on the surface thereof are removed continuously by gravity via the overflows of the reservoir/collector segments.

The adjutages are fed with substantially clean scrubbing water through the feed openings provided in the longitudinal walls of the enclosures, via the two reservoir/collector segments that are adjacent to them.

For example, the apparatus of the invention may advantageously be used in the spray booth of a painting facility, in which the air charged with particles of paint must be scrubbed before being removed. The apparatus may be installed as a second scrubber, before the solvent treatment station, and after main scrubber.

What is claimed is:

1. An apparatus for scrubbing with scrubbing water a continuous flow of charged gas that is charged with solid or semi-solid particles, the apparatus comprising:
   a scrubbing chamber delimited by a side wall and a bottom plate perpendicular to the continuous flow of charged gas, said bottom plate being provided with a longitudinal slot providing an inlet through which the continuous flow of charged gas enters said scrubbing chamber;
   a longitudinal adjutage projecting from said bottom plate into said scrubbing chamber to extend said longitudinal slot, said longitudinal adjutage opening directly into said scrubbing chamber;
   inlet means through which the scrubbing water is fed, in a non-sprayed form, into said scrubbing chamber, forming a pool of said scrubbing water on said bottom plate;
   a splitter situated in said scrubbing chamber, spaced apart and downstream from said longitudinal adjutage, positioned perpendicular to the continuous flow of charged gas, and provided with a plurality of through orifices;
   first removal means for removing a continuous flow of at least partially scrubbed gas from said scrubbing chamber, said first removal means located downstream from said splitter;
   second removal means for removing the scrubbing water and said collected particles from said scrubbing chamber having at least one overflow projecting from said bottom plate into said scrubbing chamber; and
   recycling means, connected to said second removal means, for removing at least a part of said collected particles from said scrubbing water, and connected to said inlet means for feeding recycled scrubbing water into said scrubbing chamber;
   wherein said charged gas passes through said longitudinal slot and said longitudinal adjutage, and enters directly into said scrubbing chamber in which said charged gas draws water from said pool of scrubbing water to create a scrubbing mixing flow of said scrubbing water and said charged gas, said scrubbing mixing flow being completely unobstructed within said scrubbing chamber between said longitudinal adjutage and said splitter.

2. The apparatus according to claim 1, wherein the overflow has an overflow height that is greater than the height of the longitudinal adjutage.

3. The apparatus according to claim 1, wherein said bottom plate is provided with a plurality of longitudinal slots that are parallel to one another, each of which is extended by a longitudinal adjutage.

4. The apparatus according to claim 1, wherein the longitudinal adjutage has a cross-section in a general shape of a trapezium, with the small base adjoining the plate.

5. The apparatus according to claim 1, wherein the longitudinal adjutage has a cross-section in a general shape of two trapeziums, the small base of the first trapezium adjoining the bottom plate, the second trapezium extending the first trapezium, and the small base of the second trapezium adjoining the large base of the first trapezium.

6. The apparatus according to claim 5, wherein the respective heights of said first trapezium and of said second trapezium are substantially the same size.

7. The apparatus according to claim 1, wherein the longitudinal adjutage is flanked on either side by longitudinal walls, and is flanked transversely at either end by transverse walls projecting from the bottom plate towards the scrubbing chamber, which walls co-operate to form an enclosure that surrounds the adjutage, and that is open towards the scrubbing chamber, the enclosure having a height that is greater than the overflow height of the removal means for removing the scrubbing water and the collected particles, and being provided with feed openings for feeding the longitudinal adjutage, which openings are situated in the vicinity of that edge of each of the longitudinal walls which adjoins the bottom plate.

8. The apparatus according to claim 1, including a prewetting chamber for pre-wetting the flow of charged gas, which chamber is located upstream from the bottom plate.

9. The apparatus according to claim 1, including at least one moisture eliminator stage for eliminating the moisture of the flow of at least partially scrubbed gas, which stage is constituted by a baffle-type filter or by a droplet eliminator, and is located between the splitter and the removal means for removing the flow of at least partially scrubbed gas.

10. The apparatus according to claim 1, wherein the outside of the side wall is generally rectangular block-shaped, with four side faces, the longitudinal slots extending between two opposite side faces, the inlet means for the scrubbing water being located in the vicinity of one of the faces, the removal means for removing the scrubbing water and the collected particles being located in the other face.

11. The apparatus according to claim 7, wherein the inlet means for the scrubbing water open into reservoir/collector segments only, which segments are defined by the spaces between the enclosures.

12. The apparatus according to claim 7, wherein the removal means for removing the scrubbing water and the collected particles are overflows disposed in the reservoir/collector segments only, which segments are defined by the spaces between the enclosures.

13. An apparatus for scrubbing with scrubbing water a continuous flow of charged gas that is charged with solid or semi-solid particles, the apparatus comprising:
   a prewetting chamber;
   gas inlet means for introducing the continuous flow of charged gas into said prewetting chamber;
   ejecting means for ejecting scrubbing water into said gas inlet means to prewet the continuous flow of charged gas as said charged gas passes through said inlet means;
   a scrubbing chamber disposed downstream from said prewetting chamber, said scrubbing chamber delimited by a side wall and a bottom plate, said bottom plate being provided with a longitudinal slot providing an inlet through which the continuous flow of prewetted charged gas enters said scrubbing chamber;

a longitudinal adjutage projecting from said bottom plate into said scrubbing chamber to extend said longitudinal slot;

scrubbing water inlet means through which the scrubbing water is fed, in a non-sprayed form, into said scrubbing chamber, forming a pool of said scrubbing water on said bottom plate;

scrubbing water removal means for removing the scrubbing water and said collected particles from said scrubbing chamber; and gas removal means for removing a continuous flow of at least partially scrubbed gas from said scrubbing chamber.

* * * * *